United States Patent [19]
Few

[11] 3,925,726
[45] Dec. 9, 1975

[54] ELECTRIC FIELD SENSOR
[75] Inventor: Arthur A. Few, Houston, Tex.
[73] Assignee: The United States of America as represented by the Secretary of the Navy, Washington, D.C.
[22] Filed: May 8, 1974
[21] Appl. No.: 468,128

[52] U.S. Cl. .................................. 324/72; 343/872
[51] Int. Cl.² ........................................ G01R 31/02
[58] Field of Search ......... 324/1, 72, 72.5; 343/709, 343/797, 873, 872

[56] References Cited
UNITED STATES PATENTS

| | | | |
|---|---|---|---|
| 3,188,472 | 6/1965 | Whipple | 324/72 |
| 3,273,066 | 9/1966 | Ruhnke | 324/72 |
| 3,564,529 | 2/1971 | Kaufman | 324/72 |
| 3,586,973 | 6/1971 | Lawton | 324/72 |
| 3,662,260 | 5/1972 | Thomas | 324/72 |

Primary Examiner—R. V. Rolinec
Assistant Examiner—Michael J. Tokar
Attorney, Agent, or Firm—R. S. Sciascia; R. E. O'Neill

[57] ABSTRACT

An improved electric field sensor for measuring the vertical and horizontal electric field of the atmosphere. This is accomplished by providing a superpressure balloon having its surface divided into four isolated quadrants and carrying the electronic package inside the balloon for measuring and transmitting the information and providing a structure on the surface of the balloon to cause it to rotate and thereby take a series of measurements of the atmospheric electric gradient.

7 Claims, 5 Drawing Figures

ELECTRIC FIELD SENSOR

The invention described herein may be manufactured and used by or for the Government of the United States of America for governmental purposes without the payment of any royalties thereon or therefor.

The purpose of this device is to make accurate measurements of the vector electric field in the air both in fair weather conditions and inside thunderstorm clouds with a small (~ 12 ft. diameter) balloon system.

Various methods have been employed to obtain measurements of the atmospheric electric field inside thunderclouds. The electric field mill is a device that measures the induced charge (or current) to an insulated plate whose exposure to the electric field exterior to the instrument is mechanically modulated with a motor driven system of conducting blades, vanes, sutters or similar devices. Since the system that encloses the measuring instrument and the vehicle that transports the system into the cloud distort the ambient atmospheric electric field an accurate measure of the enhancement factor produced by the vehicle and instrument must be obtained.

If the vehicle transporting the instrument becomes charged with static electricity then the electric field from the static changes influences the measured electric field. In some cases the influence of this charge can be removed by using data from a second field mill or the equivalent.

If two uncharged conductors are placed in an external electric field, each will assume a potential equal to the "average" potential of the air surrounding it. If the two conductors are now connected by a wire then an induced charge will flow from one conductor to the other until they both have the same potential, which is now equal to the "average" potential of the air surrounding the system of conductors. The displaced (or induced) charge is directly proportional to the strength of the external electric field. The electric field can, therefore, be measured by knowing the geometry of the conductors and the induced charge. Usually, however, one measures the current that is induced as the conductor system is moved or rotated in the external field; when properly calibrated one can obtain a measurement of the magnitude of the electric field component perpendicular to the axis of rotation by this technique. If the vehicle rotates as a whole with the measuring conductors then the measurement is independent of a static charge on the vehicle or instrument. If, however, the rotating conductors are separate from the vehicle then one must deal with any static charge that accumulates on the vehicle. In order to obtain vector electric field measurements one needs to measure the induced charge between more than a single pair of conductors depending upon the number or rotational degrees of freedom that are available.

Another method is to use high impedence potential probes. The construction of this device is similar to the previous discussion except that the system of conductors are connected through very high impedences so that the current that flows between the conductors is much smaller than is required to bring the conductors to an equal potential as a result of the induced charge flow. In other words the induced charge flow is inhibited by the high impedence. In this situation each conductor should reach the potential of the "average" atmospheric potential surrounding the conductor or probe. The high impedence measuring device then measures the potential difference between the probes from which one can compute the electric field strength. The various possible arrangements for the conductors and their motions or rotations are the same as described above, the only difference is that one is low impedance and measures either charge or current and the other is high impedence and measures potential.

The limiting condition on the potential probe is that the measuring instruments must draw some current in order to function. If the probes are to maintain air potential then the current to the instrument must be supplied to the probes by the air. One has therefore a limit based on the conductivity of air, to the current that can be used in the measuring processes. All instruments of this type are highly susceptible to damage from corona discharge currents that frequently occur inside thunderclouds.

Potential probes with equalizers are identical in theory to the potential probes discussed above except that the probes are coated with a radio-active material (usually polonium). The radioactivity ionizes the air in the immediate vicinity of the probe thus lowering the resistance between the probe and the air. This enables the user to employ smaller impedance in the measuring circuit than required by the probe without the equalizer.

A corona point measurement can be made if two elongated conductors are pointed in opposite directions in a strong electric field and a current meter is connected between them. The meter will register the corona current that flows into one tip and out of the other tip. For controlled environmental conditions and fixed geometry the current can be functionally related to the electric field strength.

When selecting the appropriate vehicle; rockets, aircraft, dropsounds, teathered balloons, and free floating balloons are all candidates for making in situ measurements of electric fields in clear air and inside clouds. The cloud is by far the more difficult and is the problem to which the invention is directed.

Aircraft have the advantage of controlling to some degree the position of the measurement, but they also have a number of disadvantages: (1) The aircraft facility is expensive to maintain. (2) There is a real hazard to the aircraft and personnel when flying into the center of active thunderstorms. (3) The aircraft strongly distorts the ambient electric field and the magnitude of the distoriton should be accurately calibrated. In practice this is usually done by flying the aircraft near the earth's surface in clear weather and comparing the aircraft measurements with measurements made on the ground. This procedure is not accurate since it assumes that (a) the electric field at the aircraft is the same as on the ground and (b) the presence of the conductive Earth does not alter the aircraft field distortion. (4) At various tips of the aircraft the strong ambient electric field will be enhanced to even higher values by the field distortion and a corona discharge will be produced. This discharge leaves tracks of ions along the flight path and alters the ambient electric field. If corona occurs at or near the measuring instrument then the ion-cloud will prevent any real measurement of the ambient field.

Rockets can be calibrated under laboratory conditions and are not as expensive as aircraft operations. The rockets are, however, hazardous during launch in the thunderstorm environment and their flights must be restricted to controlled non-populous areas. The same corona problems exist for the rocket that was discussed in connection with the aircraft. The duration of the rocket flight is short and in some applications only the field component perpendicular to the trajectory can be measured.

Dropsondes require the expense associated with the aircraft facility capable of flying over the cloud tops in order to drop-the-sonde. There is no control over the flight. Differential wind speeds between the sonde and the drap chute or balloon can produce unpredictable motions in the system. And again, corona from the dropsonde can obviate the desired measurement of the ambient atmospheric electric field.

Teathered and free balloons with suspended payloads will have a very bad stress and unpredictable motion problems inside thunderclouds due to the strong differential wind sheers, gusts, and updrafts. Furthermore, large quantities of static charge can collect on the surface of the balloon and distort the ambient electric field. The teathered balloon can be used only within the cloud base.

It is therefore an object of this invention to provide an improved means for measuring horizontal and vertical components of electric fields in the atmosphere in both clear weather and inside clouds.

It is yet a further object of this invention to provide an improved means for measuring atmospheric electric charges by providing an airborne balloon structure having its surface divided into four parts each electrically insulated from each other, an electronic circuit carried within the balloon for both measuring electric fields and transmitting the information to remote spots; individual segments coupled to the electronic circuits for measuring the horizontal and vertical components of the atmospheric voltage.

It is still a further object of this invention to provide balloons that has means mounted thereon to cause the balloon to rotate while in flight and thereby takes a series of measurements for determining the atmospheric charge.

A further object of this invention is to provide an improved balloon electric field sensor comprising a superpressure balloon having a substantially spherical surface when inflated; the surface of the balloon being divided into a plurality of electric insulated segments; electronic circuitry positioned inside the balloon surface; one group of the insulated segments being connected to the electronic circuitry for measuring vertical electrical field components, and a second group of the insulated segments coupled to the electronic circuitry for measuring horizontal electrical field components; the electronic circuitry including means for measuring the electrical field components and for transmitting the information to a remote location.

Other objects, advantages and novel features of the invention will become apparent from the following detailed description of the invention when considered in conjunction with the accompanying drawings wherein.

Figure 1:
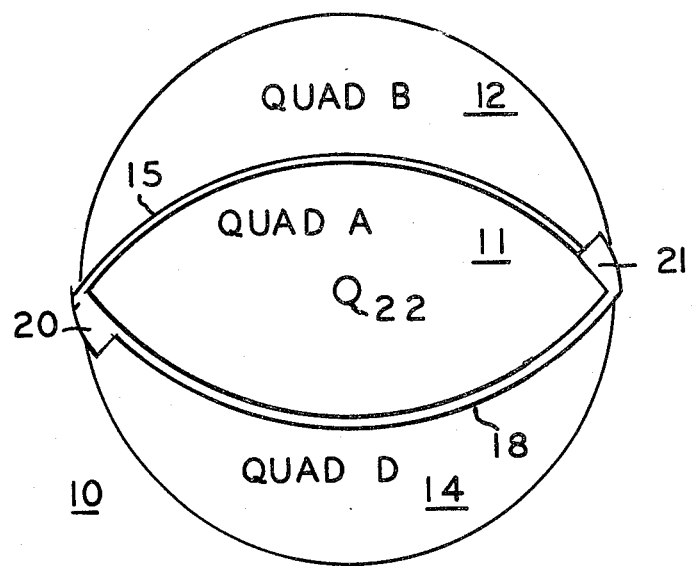
FIG. 1, shows a top view of one embodiment of the invention.
Figure 2:
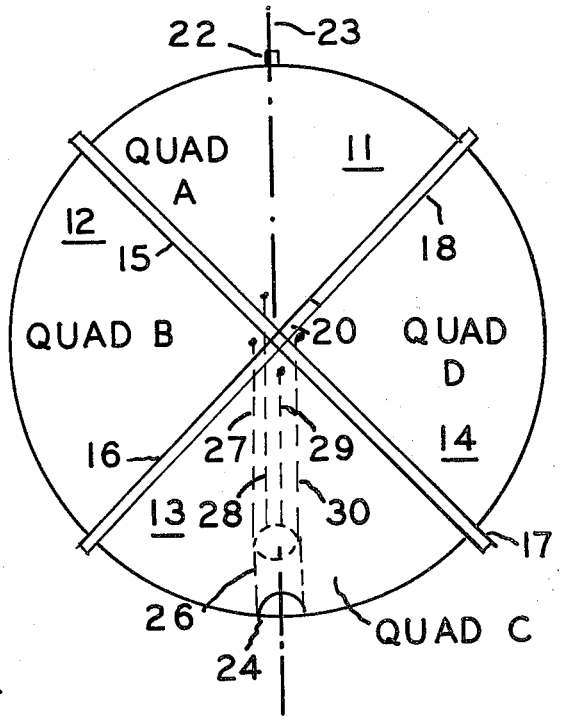
FIG. 2, shows a first side view of the embodiment shown in FIG. 1.
Figure 3:
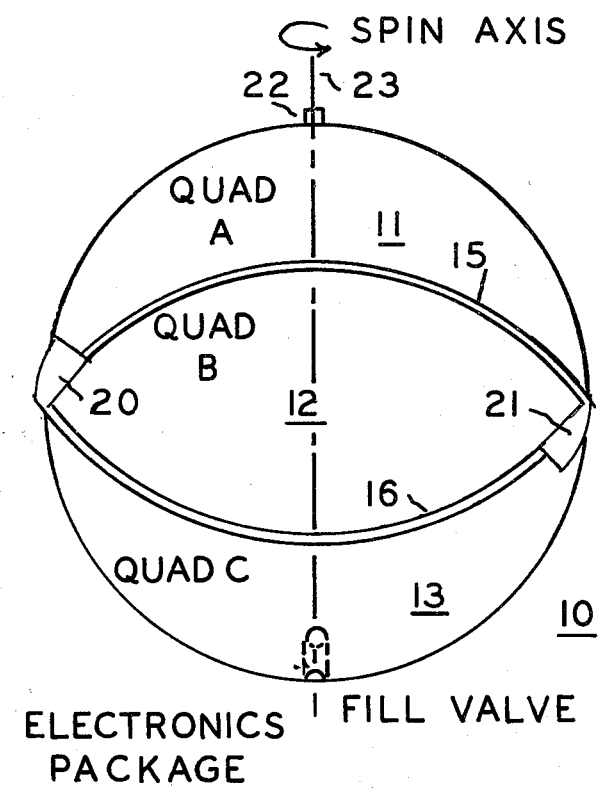
FIG. 3, shows a second side view of the embodiment shown in FIG. 1.

The balloon package as shown includes a basic balloon shell 10 having the shell divided into four quadrants, 11, 12, 13 and 14. Each of the quadrants is divided from its adjacent neighbor by a series of ribs, 15, 16, 17 and 18. The ribs are located on diameters of the balloon which are great circles of the balloons. Spin paddles are provided on the balloon structure and are positioned upon the rib members individually and are designated as 20, 21. As shown in the figures, quadrant 11 is on the upper quarter of the balloon while quadrant 13 is on the lower quarter. Quadrants 12 and 14 are positioned on the remaining two quarters. The spin paddles are included so that upon ascent of the balloon, the entire balloon structure rotates.

A relief valve 22 is shown at the top of the balloon and is along the vertical axis of the balloon 23. Opposite the relief valve and located on the vertical axis 23, is an insertion plate and collar 24. Its purpose is to allow for the insertion of the electronic package including the electronic circuitry 26 necessary for making the measurements and transmitting the information. Four interior leads, 27, 28, 29, and 30 are provided connecting the quadrants 11, 12, 13 and 14 individually to the electronic circuitry.

The insertion plates and collars are provided for the fill valve.

Several advantages are provided with this structure in that the external electric field, the balloon electric field sensor appears as a spherical conductor that has a configuration that has the smallest field enhancement factor of any possible shape. Therefore, there will be the minimum possible corona problem. The distortion can be accurately calculated for this shape hence calibration of distortion is not required. The calibration is performed by following the following formula.

$$E = E_o \left\{ \left(1 + \frac{2A^3}{r^3}\right)\cos\theta \, \hat{r} - \left(1 - \frac{A^3}{r^3}\right)\sin\theta \, \hat{\theta} \right\}$$

With the spherical shape differential wind speed effects will be less than with any other shape, thus the motion will be more regular and predictable. With the electronics package located inside the conducting sphere it will be shielded from environmental and electrical disturbances.

In one embodiment, the charge transferring between quadrant pairs is measured by integrating the current passing through a relatively low impedance RC circuit. The low impedance will protect the electronic payload from damage due to corona and large field changes from nearby lightning flashes.

The induced (or displacement) charge can be computed for the quadrants accurately from theory by the following formula.

$Q_{top} = 3 \pi \epsilon_o E_o R^2 \sin \pi/4$

The magnetic sensor that measures the horizontal orientation of the balloon may be used to obtain the two horizontal components from the total horizontal field.

It should be pointed out that the advantages of the vertical ridges separating the quadrants is to keep the rainwater from short circuiting the quadrants. The two spin paddles 20, 21 provide rotation as the balloon moves in its vertical path.

Obviously many modifications and variations of the present invention are possible in the light of the above teachings. It is therefore to be understood that within the scope of the appended claims the invention may be practiced otherwise than as specifically described.

I claim

1. An improved balloon electric field sensor comprising:

a. a superpressure balloon having a substantially spherical surface when inflated and having a vertical axis;
b. said surface of said balloon being divided into a plurality of segments wherein each segment is electrically insulated from another;
c. electronic circuitry positioned inside said balloon surface;
d. one group of said surface segments being connected to said electronic circuitry for measuring any vertical electrical field component in the atmosphere and a second group of surface segments coupled to said electronic circuitry for measuring any horizontal electrical field component in the atmosphere; and,
e. said electronic circuitry including means for measuring said electrical field components and means for transmitting said information to a remote location.

2. The improved balloon electric field sensor of claim 1 wherein said surface of said balloon is divided into four substantially equal segments each insulated from the other.

3. The improved balloon electric field sensor of claim 2 wherein first and second of said insulated segments are positioned on the upper and lower quarters of the balloon surface, the third and fourth segments are positioned upon the side quarters of said balloon surface.

4. The improved balloon electric field sensor of claim 3 wherein said segments are divided outwardly extending ridges about the diameter of said balloon surface.

5. The improved balloon electric field sensor of claim 4 wherein portions of said ridges extend outwardly and form paddles which react with the atmosphere as the balloon ascends causing said balloon to rotate thereby sampling the atmospheric electric field in a rotating manner.

6. The improved balloon electric field sensor of claim 5 wherein said electric circuitry is positioned at the lower end of the vertical axis of the balloon thereby maintaining the vertical axis of said balloon substantially perpendicular to the surface of the earth.

7. The improved balloon electric field sensor of claim 6 wherein interior lead wires are provided connecting the surface segments to the electric circuitry for taking the measurements of the vertical and horizontal electric field components.

* * * * *